Nov. 19, 1929.  W. C. MELCHOR  1,736,320
GEAR SHIFTING MECHANISM FOR MOTOR VEHICLES
Filed Nov. 18, 1927  2 Sheets-Sheet 1

Inventor
Warren C. Melchor

By *Clarence A. O'Brien*
Attorney

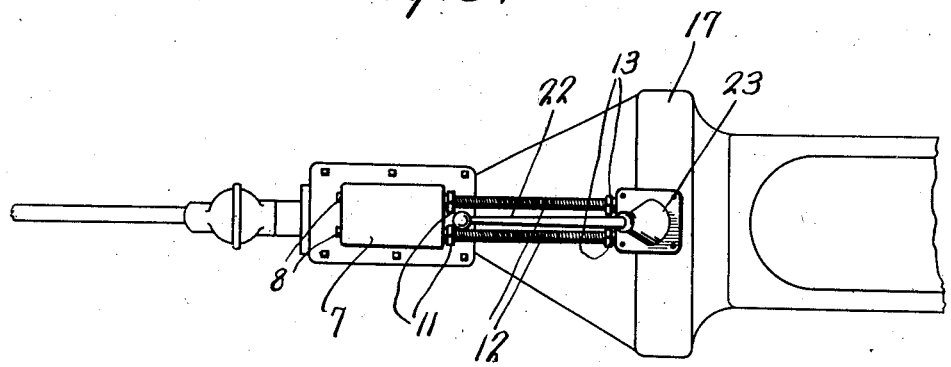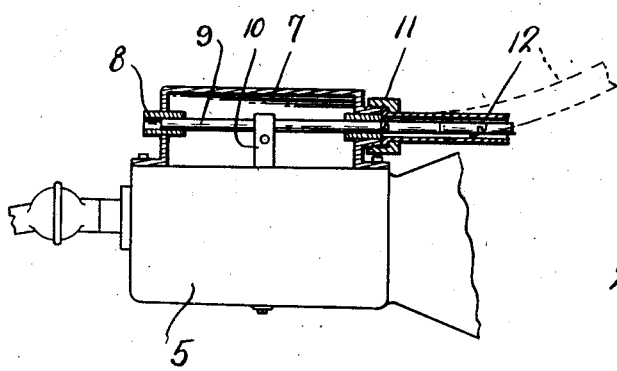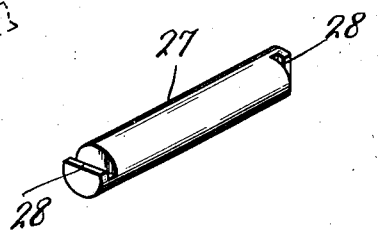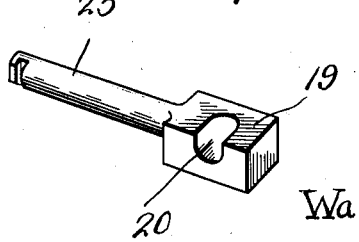

Patented Nov. 19, 1929

1,736,320

UNITED STATES PATENT OFFICE

WARREN C. MELCHOR, OF FAYETTEVILLE, NORTH CAROLINA

GEAR-SHIFTING MECHANISM FOR MOTOR VEHICLES

Application filed November 18, 1927. Serial No. 234,164.

The present invention relates to a gear shifting mechanism for motor vehicles and has for its primary object to mount the usual gear shifting lever through which the gear shifting mechanism is controlled in an out of the way position within the driver's compartment of the vehicle whereby to increase the foot room thereof.

A further object of the invention is to provide for the operation of the transmission gear in a conventional manner without necessitating any alteration or changes in the construction thereof or the relation with respect to the manner of operation by means of a gear shift lever, the invention comprising substantially the location of the lever at a relatively remote position from the transmission housing and providing a novel connection therebetween for the control and operation of the transmission.

A still further object is to provide an apparatus of this character of simple and practical construction, which is efficient and reliable in performance, which does not materially increase the cost of production and installation compared with the usual mechanism of this character and which is otherwise well adapted to the purposes for which the same is intended.

Figure 1:
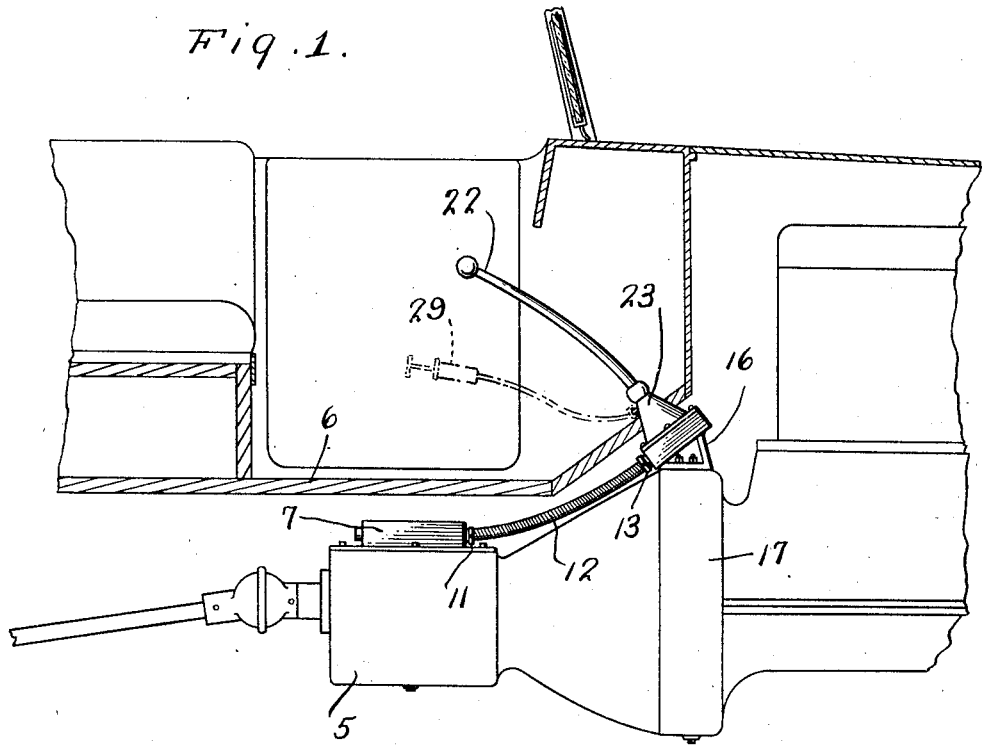
Figure 2:
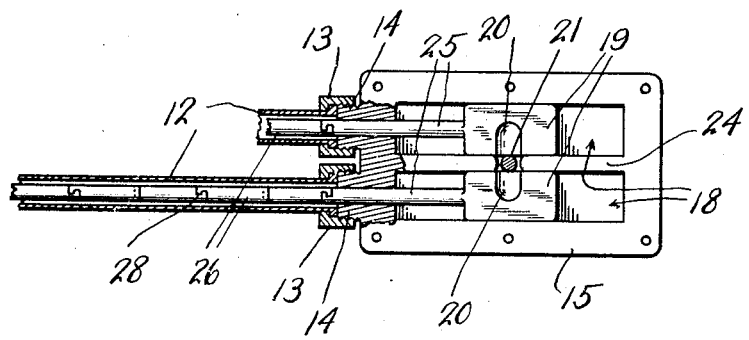

Other objects and advantages reside in the special construction and combination of the various elements comprising the invention, reference being had to the accompanying drawings forming a part hereof, wherein:

Figure 1 is a fragmentary sectional view through the driver's compartment of a motor vehicle showing the location of my improved gear shifting mechanism with respect thereto, Figure 2 is a plan view of the housing arranged at the base of the gear shift lever showing the selective sliding block arranged therein forming the connection between the transmission gear shifting fork and the lever, Figure 3 is a plan view of the mechanism in assembled position, Figure 4 is a longitudinal vertical sectional view showing the connection provided for the device at the transmission housing, Figure 5 is a perspective view of one of the links forming the flexible connecting shaft and Figure 6 is a similar view of one of the sliding blocks with one of the links formed at one end thereof.

Referring now to the drawings in detail, I have shown my invention installed in operative position with respect to an automobile of conventional construction, and in which the transmission housing 5 is disposed immediately beneath the floor boards 6 of the driver's compartment. It is the usual practice to extend the lower end of the transmission gear shift lever through the floor board and through the cover plate of the transmission housing for operatively connecting the same with the shifting fork of the transmission, but such practice has proven generally unsatisfactory as the lever considerably reduces the foot room in the car and interferes with the driver in moving from one side of the seat to the other when entering or leaving the car from the opposite side thereof.

By equipping the automobile with a gear shifting mechanism constructed in accordance with my invention, I substitute a special cover plate 7 for the transmission housing, end plates of the usual cover plate which is substantially similar in design, except through the omission of the opening usually provided in the top thereof for receiving the lower end of the gear shift lever. The cover plate is provided with the usual bearing guide 8 for receiving the opposite end of the gear shifting rod 9 to which the shifting forks 10 are attached. To the forward bearing side is attached a threaded coupling 11 by means of which the rear end of a flexible shaft housing 12 is attached thereto.

The shaft housing 12 extends forwardly under the floor board 6 with its forward end provided with a similar threaded coupling 13 by means of which the housing is attached to a nipple 14 formed along the rear edge of a housing 15 supported at an inclined angle as shown in Figure 1 of the drawings upon a bracket 16 secured at the top of the fly wheel housing 17.

Within the housing 15 is formed a pair of longitudinally extending recesses 18 forming guides for a pair of longitudinally sliding blocks 19, each of said blocks having a recess 20 formed at their adjacent sides along the upper edge thereof and adapted to selectively receive the lower end 21 of the gear shifting lever 22 which is swivelly mounted adjacent its lower end in the cover plate 23 arranged on the housing 15. Any suitable construction may be employed for providing for the swivel movement of the lever in a manner well understood in the art to enable the transverse movement of the lower end 21 of the lever for inserting the same in the recesses 20 of either of the sliding blocks 19 and also for subsequently moving the block forwardly or rearwardly. The longitudinal recesses 18 forming the guide means for the block 19 are divided by longitudinally extending partitions 24 intermediate the ends of which is arranged an opening through which the lower end 21 of the lever may be formed for insertion in either of the recesses 20 arranged in the blocks 19 at the opposite sides of the partition.

Formed at the rear of each of the blocks 19 is a longitudinally extending rod 25 slidably received in one of the nipples 14 and to each of which one of the flexible shaft housings 12 is attached.

A flexible shaft 26 is slidably carried in each of the housings 12 and composed of a series of cylindrical rod sections 27 arranged in end to end relation and forming links, each rod having its end provided with a segmental projection of approximately one half the area of the end of the rod and having a flange 28 formed along its edge extending transversely of the rod and in spaced relation from the end whereby to form a channel adapted to receive the flange carried on the end of the adjacent rod to provide an interlocking connection therebetween, thus enabling the longitudinal movement of the shaft as a unit.

As illustrated in Figure 5, the segmental projection with its associated flanges at the opposite end of each rod formed at right angles from each other permitting of an equal flexing action of the shaft in all directions. The connected ends of the rod are fitted with sufficient freedom to permit of a slight play at the end by reason of which flexibility of the shaft is created.

The ends of the rod 25 are likewise provided with segmental projections and flanges of a similar nature by means of which an interlocking connection is made with the forward ends of each of the shafts 26. A similar connection is formed between the forward end of the sliding rod 9 attached to the transmission forks and with the rear end of the shaft 26, thereby completing the connection between the sliding blocks 19 and the rods 9 for the longitudinal movement thereof as a unit.

The forward and rearward sliding movement of each of the blocks 19 in a manipulation of the transmission gears for the engagement thereof for driving the car in the usual manner at the three forward speeds and the one reverse speed, each extreme forward and more rearward position of each block representing one of said speeds and their intermediate position as shown in Figure 2, representing the neutral position of the gears.

As clearly illustrated in Figure 1 of the drawing, the inclined position of the housing 15 enables the lever 22 to extend in a direction toward the rear of the car so that while the lower portion of the lever is removed from contact by the feet of the driver or the passenger occupying the front seat of the car, the control end of the lever is disposed within convenient reach by the driver.

The cover plate 23 of the housing 15 may be provided with a grease connection of a well known construction enabling the attachment of a grease gun 29, shown by the dotted lines in Figure 1 for supplying a suitable lubricant to the sliding block 19 within the housing.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

In a flexible shaft for remotely controlling vehicle transmissions comprising a plurality of interconnected links, each link being formed of a cylindrical rod section having a segmental projection formed at each end thereof, a transversely arranged flange extending along the edge of said projection in spaced relation from the end of the rod whereby to form a channel therebetween and adapted to form an interlocking connection with the complementary formed end of the adjacent rod section, the flanges of said projections at the respective ends of the rod sections being disposed at right angles to each other.

In testimony whereof I affix my signature.

WARREN C. MELCHOR.